United States Patent
Bitsch et al.

(10) Patent No.: US 8,985,920 B2
(45) Date of Patent: Mar. 24, 2015

(54) BLADE HOLDING APPARATUS

(71) Applicants: Michael Brix Bitsch, Terndrup (DK); Peter Knudsen, Vestbjerg (DK); David Stien Pedersen, Aalborg (DK); Reza Talebnasab, Gistrup (DK); Jesper Uhrenholt, Svenstrup (DK)

(72) Inventors: Michael Brix Bitsch, Terndrup (DK); Peter Knudsen, Vestbjerg (DK); David Stien Pedersen, Aalborg (DK); Reza Talebnasab, Gistrup (DK); Jesper Uhrenholt, Svenstrup (DK)

(73) Assignee: Siemens Aktiengesellschaft, München (DE)

( * ) Notice: Subject to any disclaimer, the term of this patent is extended or adjusted under 35 U.S.C. 154(b) by 11 days.

(21) Appl. No.: 13/906,681

(22) Filed: May 31, 2013

(65) Prior Publication Data

US 2013/0334378 A1    Dec. 19, 2013

(30) Foreign Application Priority Data

Jun. 1, 2012  (EP) .................................... 12170530

(51) Int. Cl.
  *B60P 3/40* (2006.01)
  *F16M 11/04* (2006.01)
  *F03D 1/00* (2006.01)

(52) U.S. Cl.
  CPC ............... *F16M 11/04* (2013.01); *F03D 1/005* (2013.01); *Y02E 10/72* (2013.01)
  USPC ............... 410/44; 248/647; 410/120

(58) Field of Classification Search
  CPC ........... F03D 1/005; F03D 11/00; B60P 3/40; B60P 3/41; B61D 3/16; B61D 45/003; F05B 2230/61; B66C 1/108
  USPC .............. 248/544, 647, 671; 410/44, 45, 120; 280/404
  See application file for complete search history.

(56) References Cited

U.S. PATENT DOCUMENTS

| | | | | |
|---|---|---|---|---|
| 4,412,774 | A * | 11/1983 | Legrand et al. | 414/589 |
| 7,303,365 | B2 * | 12/2007 | Wobben | 410/45 |
| 7,591,621 | B1 * | 9/2009 | Landrum et al. | 410/45 |
| 7,670,090 | B1 | 3/2010 | Landrum et al. | |
| 7,704,024 | B2 * | 4/2010 | Kootstra et al. | 410/44 |
| 7,744,318 | B2 * | 6/2010 | Wobben | 410/45 |
| 7,967,536 | B2 * | 6/2011 | Broderick et al. | 410/45 |
| 7,985,039 | B2 * | 7/2011 | Wobben | 410/45 |
| 8,096,739 | B1 * | 1/2012 | Landrum et al. | 410/45 |
| 8,192,117 | B1 * | 6/2012 | Landrum et al. | 410/45 |
| 8,366,360 | B2 * | 2/2013 | Krogh et al. | 410/44 |
| 8,382,407 | B1 * | 2/2013 | Landrum et al. | 410/45 |
| 8,602,700 | B2 * | 12/2013 | Johnson | 410/44 |
| 8,672,131 | B2 * | 3/2014 | Nogueira et al. | 206/521 |
| 8,708,625 | B1 * | 4/2014 | Landrum et al. | 410/44 |
| 8,753,050 | B2 * | 6/2014 | Cyrus et al. | 410/45 |
| 2007/0177954 | A1 * | 8/2007 | Kootstra et al. | 410/44 |
| 2009/0169323 | A1 * | 7/2009 | Livingston | 410/120 |
| 2011/0299968 | A1 * | 12/2011 | Poulsen et al. | 414/800 |
| 2013/0315685 | A1 * | 11/2013 | Pedersen et al. | 410/44 |
| 2014/0064870 | A1 * | 3/2014 | Thomsen | 410/44 |

FOREIGN PATENT DOCUMENTS

| | | |
|---|---|---|
| DE | 10211357 A1 | 9/2002 |
| WO | WO 2009141018 A2 | 11/2009 |
| WO | WO 2012066158 A1 | 5/2012 |

* cited by examiner

*Primary Examiner* — Bradley Duckworth

(57) ABSTRACT

A blade holding apparatus for holding one end of a wind turbine blade during handling, which blade holding apparatus includes a support structure including an opening for accommodating one end of the wind turbine blade, a clamping arrangement arranged in the opening, which clamping arrangement is realized to exert a clamping force on the wind turbine blade, and a locking arrangement for locking the clamping arrangement relative to the support structure. A method of operating such a blade holding apparatus during a handling procedure of a wind turbine blade is also provided.

19 Claims, 3 Drawing Sheets

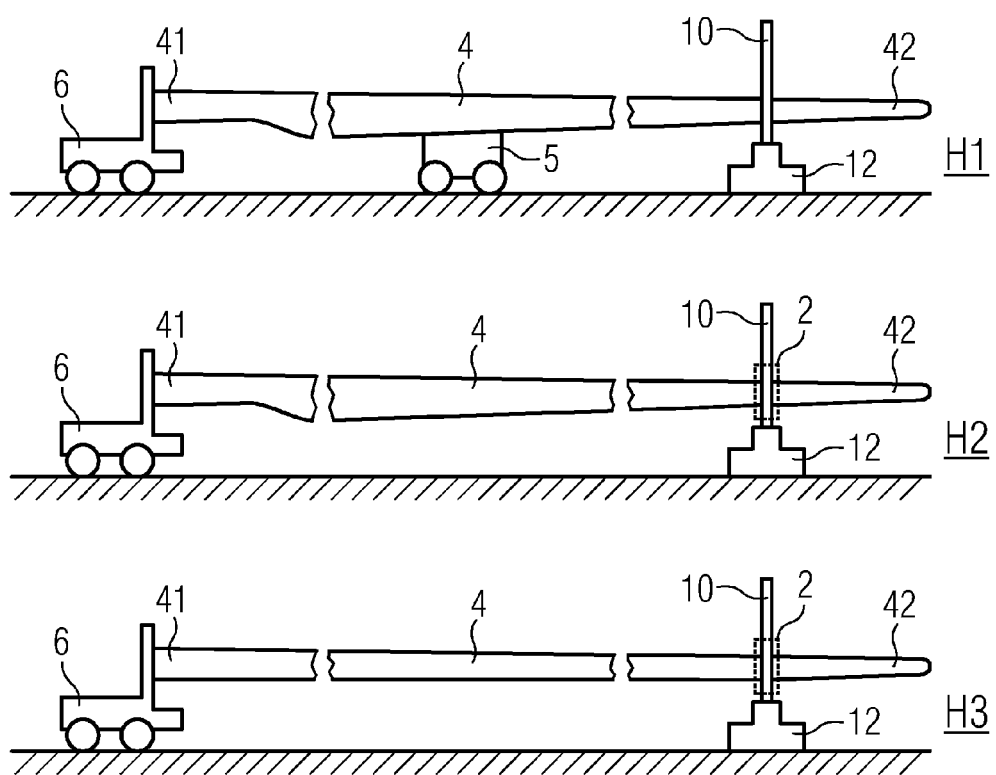

BLADE HOLDING APPARATUS

CROSS REFERENCE TO RELATED APPLICATIONS

The present application claims priority to European Patent Office application No. 12170530.5 EP filed Jun. 1, 2012, the entire content of which is hereby incorporated herein by reference.

FIELD OF INVENTION

The invention describes a blade holding apparatus and a method of operating such a blade holding apparatus.

BACKGROUND OF INVENTION

Rotor blades for a wind turbine must be finished according to certain criteria. For example, the outer surface of the rotor blade must be smooth, so that the aerodynamic properties of the rotor are not compromised. Furthermore, the surface of the rotor blade should be weather resistant. For these reasons, the surface of rotor blade must generally undergo one or more handling or processing steps such as sanding, painting, polishing, etc., before being transported to the site for mounting onto a wind turbine.

However, such a handling or processing steps can be problematic since rotor blades are becoming longer as advances in turbine design and blade manufacture allow for larger generators and larger rotor blade lengths. A rotor blade for a wind turbine can therefore exceed 70 m in length, measured from root to tip. Such a blade can easily weigh about 20,000 kg. A rotor blade is usually made of a composite material and is mostly hollow. The shape of the rotor blade alters along its length, for example from a cylindrical root section through a wider shoulder section to an airfoil portion, terminating in rather thin tip region. The differently shaped zones along the length of the blade, together with the weight of the blade and the care that must be taken to avoid any damage to the blade surface, result in expensive and time-consuming handling procedures.

In one known approach, the blade is held essentially horizontally by supporting the root end in some suitable manner, and using a holding apparatus to fix the blade at some point in the airfoil section. The known type of holding apparatus involves a stationary screw mechanism to apply a clamping force to the blade. The screw mechanism can be actuated electrically, pneumatically, or hydraulically. Since the blade is only held at two points, most of the blade surface is exposed. Access to the lower surface or the underside of the blade is relatively straightforward. However, the top side of the blade can only be accessed with difficulty. It may be necessary for workers to use cranes and/or moveable platforms in order to reach those surfaces. Alternatively, the screw mechanism can be opened to release the blade so that this can be rotated by one half turn, and then fastened again. Either way, the prior art techniques are time-consuming and therefore also expensive. Furthermore, the use of such a screw mechanism can result in damage to those regions of the blade about which it is clamped. Also, the securing of the screw mechanism relies exclusively on the manpower of the operator, so that a secure fastening cannot always be guaranteed.

SUMMARY OF INVENTION

It is therefore an object of the invention to provide an improved way of securing a wind turbine rotor blade during such a handling procedure.

This object is achieved by the blade holding apparatus of the claims, and by the method of the claims of operating such a blade holding apparatus.

According to the invention, the blade holding apparatus, for holding one end of a wind turbine blade during a handling step, comprises a support structure comprising an opening for accommodating one end of the wind turbine blade; a clamping arrangement arranged in the opening, which clamping arrangement is realised to exert a clamping force on the wind turbine blade; and a locking arrangement for locking the clamping arrangement relative to the support structure.

An advantage of the blade holding apparatus according to the invention is that the blade can be held or supported in a very straightforward manner during handling, and in such a way that only a very small fraction of its surface area is covered by elements of the clamping arrangement, so that most of the blade surface can be accessed for treatment. Furthermore, the force exerted by the clamping arrangement on the surface of the blade is very favourably distributed about the circumference of the blade, so that damage or stress to the blade can be avoided. Since the support structure is realised to hold the blade near one end, for example the tip end, it is only necessary to support the blade at one other end, for example the root end, most of the blade surface is left freely accessible.

According to the invention, the method of operating such a blade holding apparatus, during a handling procedure of a wind turbine blade, comprises the steps of passing one end of the wind turbine blade through the opening in the support structure; actuating the clamping arrangement to exert a clamping force on the wind turbine blade; and locking the clamping arrangement relative to the support structure during the handling procedure.

An advantage of the method according to the invention of operating such a blade holding apparatus is that, with a minimum of effort, most of the blade surface can be accessed for treatment. The method according to the invention is favourably safe, since the blade is clamped securely but without having to apply excessive pressure, during the handling procedure. Therefore, the safety of service workers is ensured, and the risk of damage to the blade is essentially eliminated.

Particularly advantageous embodiments and features of the invention are given by the dependent claims, as revealed in the following description. Features of different claim categories may be combined as appropriate to give further embodiments not described herein.

In the following, it may be assumed that a rotor blade comprises distinct regions such as a root section and a body section, which may be assumed to have an airfoil cross-section. The blade can taper in width and thickness towards a tip end. It may also be assumed that the blade has a front surface and back surface, whereby the usual terms for "suction side" and "pressure side" may be used to refer to the front surface with an essentially convex shape and a back surface with an essentially concave shape, respectively.

In the following, without restricting the invention in any way, the terms "wind turbine rotor blade", "rotor blade" and simply "blade" may be used interchangeably.

Since the blade is preferably held horizontally during handling, so that most of the surface area of the blade can be accessible to workers on the ground, in a particularly preferred embodiment of the invention the support structure comprises an upright plane, i.e. an essentially vertical plane. In this way, the support structure can accommodate an essentially horizontally held wind turbine blade. It follows that the upright plane of the support structure is therefore essentially perpendicular to the longitudinal axis of the blade, which longitudinal axis is understood to extend from the root section of the blade to the tip.

As indicated above, it is advantageous from the point of view of the workers that as much as possible of the blade surface is accessible to the workers on the ground, so that the workers do not need to use cranes or hydraulic platforms to reach certain regions of the blade. Therefore, in a particularly preferred embodiment of the invention, the support structure is rotatable in an essentially vertical plane, so that the blade can be turned about its longitudinal axis, thus allowing workers to access most parts of the blade. For example, in a preferred embodiment of the invention, the support structure is essentially circular, since this form lends itself to such a rotation. The support structure can be realised to rotate or turn in its vertical plane and about its centre of geometry, so that its centre remains essentially fixed or stationary. Alternatively or in addition, the support structure could be realised to roll or rotate along the ground or some other surface in the manner of a wheel, so that its centre describes a linear motion.

Preferably, the blade holding apparatus comprises a support frame for holding the support structure. Such a support frame can have a suitable bearing so that the support structure can rotate freely, i.e. with a minimum of friction. The support frame can itself be moveable, for example to transport the support structure between locations, and be equipped with wheels for this purpose, and a brake for maintaining its position at a certain location.

The support structure can be realised to grip or hold the blade at any point along its length, i.e. at the root section, at an airfoil section, at a tip section, etc. To this end, the opening can be dimensioned to accommodate the relevant section. Furthermore, the clamping arrangement can be realised to accommodate that section of the blade. Preferably, the support structure is realised to grip the blade at a point along its airfoil portion. To this end, the opening in the support structure can be realised as a "teardrop" or "stretched oval" shape, since an airfoil cross-section is generally wider at one end (corresponding to the leading edge of the blade) and narrower at the other end (corresponding to the trailing edge of the blade, which can even taper to a point). In the following, but without restricting the invention in any way, it may be assumed that the support structure and the clamping arrangement are realised to grip the blade at a point along its airfoil portion, and the terms "support structure" and "tip disc" may therefore be used interchangeably.

Preferably, a clamping force is applied essentially evenly about the section of the blade that is being supported. To this end, the support structure can comprise one or more blade gripping elements that exert a force on the blade. For example, the tip disc can comprise one blade gripping element mounted on a first side of the opening that acts to press the blade towards the opposite side of the opening. In such an embodiment, the opening is preferably shaped to suit the contour at that section of the blade. However, such a realisation might result in an uneven distribution of forces over the surface of the blade, so that damage to the blade surface might arise. Therefore, in a preferred embodiment of the invention, the clamping arrangement comprises a pair of blade gripping elements or "jaws" mounted one on each side of the opening in the support structure. Such a realisation, in which the clamping force is applied on both front and back surfaces of the blade, can provide a favourable distribution of forces and can avoid any damage to the blade surface.

The blade gripping elements can be realised in any suitable manner. Preferably, a blade gripping element is realised to conform to a contour of the wind turbine blade. The blade gripping element can be formed to already have a shape that matches a contour over a certain length of the blade and/or the blade gripping element can be formed to adapt to a contour at a specific section along the blade. For the first option, the blade gripping element can comprise a fixed basic shape, to which a layer of material such as a compressible or elastic foam is applied along a surface of the blade gripping element that will lie against the surface of the blade, to act as a protective cushion. For the second option, the blade gripping element can comprise two or more sections that are moveable relative to one another, and shaped such that they can adapt to a contour of the blade when the clamping arrangement is actuated.

The blade holding apparatus can be realised so that a manual operation of the clamping arrangement results in the blade gripping elements being pressed against the blade airfoil section in order to exert the clamping force on the blade airfoil section. However, in a particularly preferred embodiment of the invention, at least one blade gripping element is moveably mounted along its side of the opening in the support structure, whereby a motion of the blade gripping element, relative to the opening of the support structure, is effected by the weight of the blade. Such a moveable mounting allows the blade gripping element to adjust its position in response to the blade's weight. One blade gripping element can be stationary relative to the support structure, while a second blade gripping element is moveably mounted, so that, when the blade rests in the clamping arrangement, the weight of the blade results in a corresponding movement of the moveably mounted blade gripping element, which in turn acts to exert a clamping force on the blade. Preferably, both blade gripping elements are moveably mounted in such a manner.

In a particularly preferred embodiment of the invention, the clamping arrangement comprises a flexible connecting means for connecting the blade gripping elements such that a downward force exerted on the connecting means results in a downward motion of a blade gripping element. For example, such a flexible connecting means can comprise a strap suspended between lower points on the blade gripping elements. An outer edge of the blade can rest on the strap, so that, when the weight of the blade rests on the strap, a downward movement and a corresponding lateral movement of one or both blade gripping elements is effected, so that a distance between the blade gripping elements is reduced, thereby effectively exerting a clamping force on the blade. Preferably, the blade is inserted into the clamping arrangement such that a leading edge of the blade is pointing downwards. In this way, the rounded leading edge rests on the strap, and the narrow trailing edge points upwards.

To bring the blade into a state in which it is supported only by the blade holding apparatus at its tip end and by another holding apparatus at its root end, the blade may be supported initially at one or more points along its length by any suitable supporting means such as a block or a moveable dolly or trolley. The supporting action of such a supporting means can be progressively decreased until the weight of the blade at the airfoil section is carried by the strap, at which stage the positions the blade gripping elements can be locked in place by actuating the locking arrangement.

The locking arrangement can comprise any suitable means of fixing the positions of the blade gripping elements relative to the support structure. In a particularly preferred embodiment of the invention, the locking arrangement comprises a ratchet given by a first row of teeth on a blade gripping element and a corresponding second row of teeth on the support structure. Either one of these rows of teeth or ratchet rows can be moveable relative to the other. For example, one ratchet row can be spring-loaded to allow a lateral motion relative to the other rigidly mounted ratchet row. In a preferred embodiment of the invention, the first ratchet row is rigidly mounted to the blade gripping element, and the second ratchet row is spring-loaded and mounted to the support structure. To this end, a spring can be arranged between the second ratchet row and the tip disc. The teeth of the ratchet rows are realised to allow a free motion of a blade gripping element towards the narrower end of the opening in the support structure, i.e. in a downward direction when the blade is being loaded in the support structure, and to prevent a motion in the opposite direction.

Preferably, the locking arrangement comprises a position-locking means for locking a position of the ratchet, so that the ratchets are fixed in place, for example during a rotation of the support structure. To this end, the locking arrangement comprises some suitable blocking means that blocks the spring, i.e. a means that prevents the spring from compressing and therefore prevents a lateral movement of the second ratchet row. By allowing the clamping arrangement to be locked in position in this manner, the blade can be held securely by the clamping arrangement even when the support structure is rotated during the handling procedure.

The cross-sectional shape of a rotor blade changes along its length, for example from an essentially circular cross-section at its root end to a relatively flat cross-section at its outer tip end. Therefore, when the blade is rotated, the relative orientations of the tip end to the root end may change. To compensate for this, in a particularly preferred embodiment of the invention, the opening in the blade holding apparatus is preferably not arranged centrally in the tip disc, but is offset from the centre. Then, when a rotation of the blade is effected, with a corresponding rotation of the tip disc, a trajectory of the opening can follow the natural trajectory of the tip end. In a further preferred embodiment of the invention, the blade holding apparatus is also moveable in a vertical direction. To this end, for example, the support frame can comprise some means of raising the tip disc vertically. Such a vertical movement of the tip disc can be effected manually, or can be effected by means of a suitable driving arrangement such as a motorized driving arrangement. By realising the blade holding apparatus to be rotatable and vertically adjustable, it is possible to access essentially all surfaces of the blade during the handling procedure.

BRIEF DESCRIPTION OF THE DRAWINGS

Other objects and features of the present invention will become apparent from the following detailed descriptions considered in conjunction with the accompanying drawings. It is to be understood, however, that the drawings are designed solely for the purposes of illustration and not as a definition of the limits of the invention.

FIG. 5 shows stages of handling a wind turbine rotor blade using a blade holding apparatus according to an embodiment of the invention.

In the diagrams, like numbers refer to like objects throughout. Objects in the diagrams are not necessarily drawn to scale.

DETAILED DESCRIPTION OF INVENTION

Figure 1:
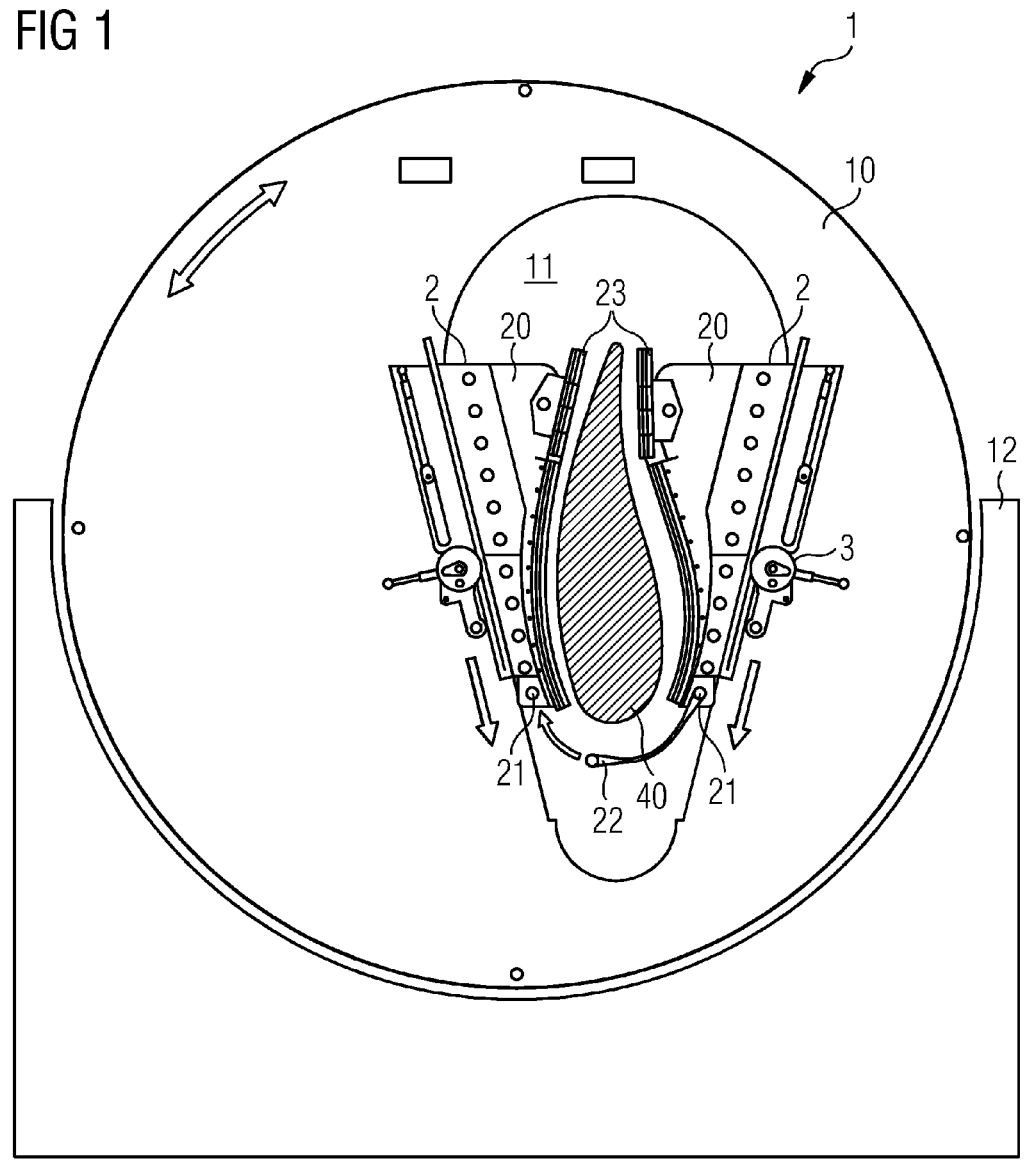
FIG. 1 shows a blade holding apparatus according to an embodiment of the invention in an initial unloaded position.

FIG. 1 shows a blade holding apparatus 1 according to an embodiment of the invention in an initial unloaded position. The diagram shows a frontal view of the blade holding apparatus 1, and shows a vertical support structure 10 or tip disc 10 mounted on a support frame 12. The tip disc 10 is rotatable in this realisation about its geometrical centre, as indicated by the curved arrow. An opening 11 is dimensioned to accommodate elements 2, 20 of a clamping arrangement. In this embodiment, the clamping arrangement comprises a pair of blade gripping elements 2, each mounted to a rigid base 20. The blade gripping elements 2 are connected by means of a removable strap 22, which is hooked onto a short pin 21 or trunnion 21. The clamping arrangement is realised to interact with a locking arrangement. To this end, the rigid base 20 of a blade gripping element 2 comprises a first row of teeth for a ratchet, and a corresponding second row of teeth is mounted on the support structure 10, such that the rows of teeth can engage, as will be shown in the following diagrams, when the blade gripping elements 2 move downwards in the directions indicated by the short arrows.

The tip end of a rotor blade has been passed through the opening 10, so that an airfoil section 40 of the blade, indicated by the cross-hatching, is placed between the blade gripping elements 2. During this manoeuvre, the root end of the blade is held, for example by a forklift truck, and the blade is supported at one or more points along its length by a supporting apparatus such as a dolly, as will be shown in FIG. 5, so that the airfoil section 40 of the blade can be moved freely through the opening 11 until a desired position is achieved.

The outer edges of the blade gripping elements 2 are covered by a protective cushion 23, which can comprise a strip of rubber, foam rubber, etc., in order to protect the surface of the blade when gripped in the clamping arrangement.

Figure 2:
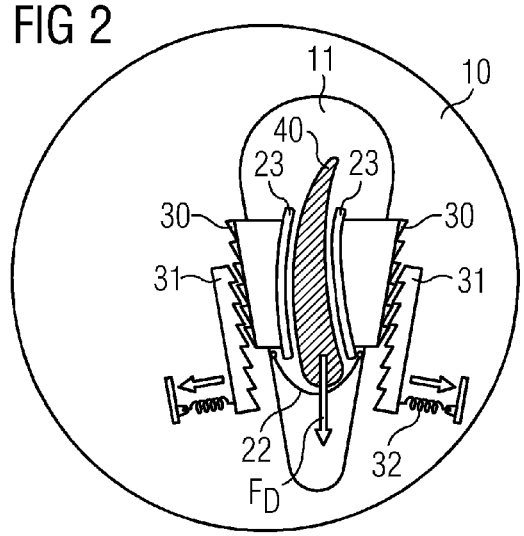
FIG. 2 shows the blade holding apparatus of FIG. 1 in a first loaded position.
Figure 3:
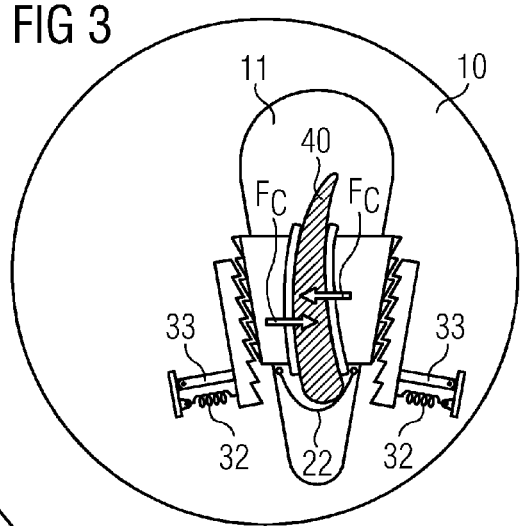
FIG. 3 shows the blade holding apparatus of FIG. 1 in a second loaded position.
Figure 4:
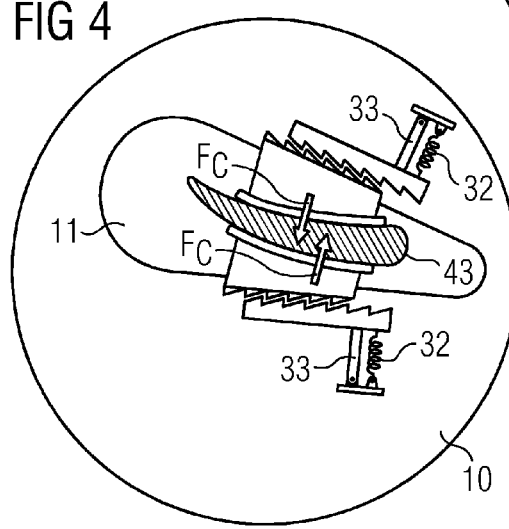
FIG. 4 shows the blade holding apparatus of FIG. 1 in a third loaded position.

FIG. 2 shows a more simplified rendering of the blade holding apparatus 1 of FIG. 1, in a first loaded position (the blade airfoil section 40 and the blade gripping elements 2 are shown in FIGS. 2-4 in a very simplified manner for the sake of clarity). At this point in the handling procedure, the supporting apparatus has been removed, so that the weight of the blade is carried only at its root end and by the strap 22 of the clamping arrangement. The weight of the blade exerts a downward force $F_D$ on the strap 22, which causes the blade gripping elements 2 to move in a downward direction, allowing the first rows of ratchet teeth 30 to move downward relative to the second rows of ratchet teeth 31, until the clamping arrangement has reached its final position. The ratchet or one-way functionality is given by the shape of the teeth, which are pointed to allow the first row of teeth 30 to freely move downwards relative to the second row of teeth 31, as indicated by the lateral arrows, while prohibiting a free movement in an upward direction. The downward motion of the first row of ratchet teeth 30 is made possible by spring loading the second row of ratchet teeth 31, as indicated schematically by the spring element 32, which allows the second ratchet row 31 to move sideways or laterally when pushed aside by a tooth of the first ratchet row 30, and to return and thereby engage with the teeth of the first ratchet row 30.

FIG. 3 shows the blade holding apparatus of FIG. 1 in a second loaded position, in this case the clamping arrangement is now in a final position. The downward motion of the blade gripping elements 2 and the tapered shape of the opening 11 have resulted in a lateral motion (as indicated by the horizontal inward-pointing arrows) of the blade gripping elements 2 so that these have been compelled to move closer to each other, reducing the gap between them and thereby exerting a clamping force $F_C$ on the airfoil section 40 of the blade, until no further downward movement of the first ratchet row is possible. FIG. 3 also schematically indicated the functionality of a locking mechanism 33 to ensure that the ratchet 30, 31 is also actively or deliberately locked in order to prevent an "upward" movement of the blade gripping elements 2. To this end, a suitable blocking device 33 is actuated to actively block the spring element 32 and to hold the ratchet rows 30, 31 in an engaged position, so that the second ratchet row 31 cannot move relative to the first ratchet row 30, i.e. these cannot disengage.

FIG. 4 shows the blade holding apparatus 1 of FIG. 1 in a third loaded position. Here, the support structure 10 has been rotated so that the opening 11 and the enclosed airfoil section 40 are now essentially horizontal. In this position, the clamping arrangement is still locked as described above, so the blade gripping elements 2 will not slip or move. They continue to exert a clamping force $F_C$ on the airfoil section 40. In this position, the strap 22 can be removed temporarily, so that the part 43 of the airfoil that was covered by the strap 22 can now be accessed for a treatment step such as sanding, polishing, painting etc.

FIG. 5 shows stages H1, H2, H3 of handling a wind turbine rotor blade 4 using a blade holding apparatus 1 according to an embodiment of the invention. In a first handling stage H1, the blade 4 is brought to the blade holding apparatus 1 using a forklift 6 to hold the blade 4 at the root end 41, and a dolly 5 to support the weight of the blade 4 at a point along its length. The tip 42 of the blade 4 is allowed to pass through the opening of the support structure 10, held by a support frame 12. A rotor blade can be very long, in the order of several tens of meters, and the drawing therefore shows only the relevant portions of the blade 4.

In a second handling stage H2, an airfoil section of the blade 4 is clamped by the blade gripping elements 2 (indicated by the broken line) of the clamping arrangement. The dolly has been removed, and the blade 4 is supported only at its root end 41 and in the support structure 10. In this position, much of the blade surface about the leading edge is accessible for treatment.

In a third handling stage H3, the blade 4 has been rotated so that the airfoil is essentially horizontal, allowing much of one "flat" side of the blade, for example the pressure side, to be accessed for treatment. The step of rotating the support structure can be repeated in the other direction, so that the other "flat" side, i.e. the suction side, can also be accessed for treatment. During this third handling stage H3, the strap of the clamping arrangement can be released or removed from the trunnions, so that the portion of the airfoil section that was covered by the strap can also be accessed for treatment.

To access the portion of the airfoil section that is covered by the blade gripping elements 2, the blade can once again be supported by the dolly, so that the clamping arrangement can be released, allowing the blade 4 to be moved further into or back out of the support structure by an appropriate amount to expose those surface portions. Then, the steps described above in handling stages H1, H2, H3 can be repeated until the entire surface of the blade 4 has been treated as desired.

Although the present invention has been disclosed in the form of preferred embodiments and variations thereon, it will be understood that numerous additional modifications and variations could be made thereto without departing from the scope of the invention. For example, instead of being rotatable about its centre of geometry, a disc-shaped support structure could be "rolled" to a certain distance along the ground, in its vertical plane, while a holding apparatus, holding the root end of the blade, follows this linear motion. In such a realisation, the opening for accommodating the blade airfoil section is preferably located essentially centrally in the support structure.

For the sake of clarity, it is to be understood that the use of "a" or "an" throughout this application does not exclude a plurality, and "comprising" does not exclude other steps or elements.

We claim:

1. A blade holding apparatus for holding one end of a wind turbine blade during a handling procedure, the blade holding apparatus comprising:
   a support structure comprising an opening for accommodating one end of the wind turbine blade;
   clamping arrangement arranged in the opening, the clamping arrangement configured to exert a clamping force on the wind turbine blade, the clamping arrangement comprises a pair of blade gripping elements mounted on opposing sides of the opening in the support structure; and
   a locking arrangement for locking the clamping arrangement relative to the support structure,
   wherein at least one of the pair of blade gripping elements is moveably mounted along a side of the opening in the support structure, a motion of the at least one blade gripping element relative to the opening of the support structure is effected by the weight of the blade.

2. The blade holding apparatus according to claim 1, wherein the support structure comprises an upright planar element for accommodating an essentially horizontally held wind turbine blade.

3. The blade holding apparatus according to claim 1, wherein the support structure is rotatable in an essentially vertical plane, wherein the clamping element rotatable along with the support structure.

4. The blade holding apparatus according to claim 1, wherein the pair of blade gripping elements are configured to conform to a corresponding contour of the wind turbine blade.

5. The blade holding apparatus according to claim 1, wherein the clamping arrangement is configured such that a downward motion of the at least one blade gripping element results in a lateral motion of the at least one blade gripping element towards the blade and a clamping force exerted on the blade.

6. The blade holding apparatus according to claim 1, further comprising a support frame for holding the support structure.

7. The blade holding apparatus according to claim 6, wherein the support frame is moveable in a vertical direction.

8. A method of operating a blade holding apparatus as claimed in claim 1 during a handling procedure of a wind turbine blade, the method comprising:
   passing one end of the wind turbine blade through the opening in the support structure;
   actuating the clamping arrangement to exert a clamping force on the wind turbine blade; and
   actuating the locking arrangement to lock the clamping arrangement relative to the support structure during the handling procedure.

9. The method according to claim 8, further comprising rotating the support structure during the handling procedure, the blade rotating along with the support structure, in order to allow access to essentially all surfaces of the blade.

10. The method according to claim 8, further comprising releasing a flexible connecting means of the clamping arrangement while the support structure is in a rotated position to access a corresponding blade surface portion.

11. The blade holding apparatus according to claim 1, comprising
a support frame for holding the support structure,
wherein the support structure having an annular outer surface and the support frame having a concave surface which mates with the support frame, and
wherein the support structure is rotatable about an axis of the support structure and the clamping arrangement rotates along with the support structure.

12. The blade holding apparatus according to claim 1,
wherein the locking arrangement maintains the clamping force by preventing a lateral movement of the pair of blade griping elements.

13. The blade holding apparatus according to claim 1, wherein the clamping force is configured to be applied to a suction side and a pressure side of the wind turbine blade.

14. The blade holding apparatus according to claim 1, comprising:
wherein the each of the pair of gripping elements is mounted to a rigid base, and
wherein each of the pair of gripping elements and the respective rigid base is arranged in the opening of the support structure.

15. The blade holding apparatus according to claim 1, comprising:
a support structure comprising an annular outer surface, a front end surface and a back end surface, wherein the opening for accommodating one end of the wind turbine blade is formed in the support structure from the front end surface through to the back end surface and surrounded by the annular outer surface.

16. The blade holding apparatus according to claim 1, comprising:
wherein the clamping force is applied by the pair of blade gripping elements.

17. A blade holding apparatus for holding one end of a wind turbine blade during a handling procedure, the blade holding apparatus comprising:
a support structure comprising an opening for accommodating one end of the wind turbine blade;
clamping arrangement arranged in the opening, the clamping arrangement configured to exert a clamping force on the wind turbine blade; and
a locking arrangement for locking the clamping arrangement relative to the support structure,
wherein the clamping arrangement comprises a pair of blade gripping elements mounted on opposing sides of the opening in the support structure
further comprising a flexible connecting means for connecting the blade gripping elements such that a downward force exerted on the connecting means results by the weight of the blade in a downward motion of the blade gripping element.

18. A blade holding apparatus for holding one end of a wind turbine blade during a handling procedure, the blade holding apparatus comprising:
a support structure comprising an opening for accommodating one end of the wind turbine blade;
clamping arrangement arranged in the opening, the clamping arrangement configured to exert a clamping force on the wind turbine blade; and
a locking arrangement for locking the clamping arrangement relative to the support structure,
wherein the clamping arrangement comprises a pair of blade gripping elements mounted on opposing sides of the opening in the support structure
wherein the locking arrangement comprises a ratchet given by a first row of teeth arranged on a blade gripping element and a second row of teeth arranged on the support structure.

19. The blade holding apparatus according to claim 18, wherein the locking arrangement comprises a position-locking means for locking a position of the ratchet.

* * * * *